United States Patent
Takeda et al.

(10) Patent No.: US 11,778,624 B2
(45) Date of Patent: Oct. 3, 2023

(54) TERMINAL, RADIO COMMUNICATION METHOD FOR A TERMINAL, AND BASE STATION

(71) Applicant: NTT DOCOMO, INC., Tokyo (JP)

(72) Inventors: Kazuki Takeda, Tokyo (JP); Yoshihisa Kishiyama, Tokyo (JP); Hiroki Harada, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/906,663

(22) Filed: Jun. 19, 2020

(65) Prior Publication Data

US 2020/0322978 A1    Oct. 8, 2020

Related U.S. Application Data

(63) Continuation of application No. 16/086,743, filed as application No. PCT/JP2017/011085 on Mar. 21, 2017, now abandoned.

(30) Foreign Application Priority Data

Mar. 23, 2016   (JP) ................................ 2016-059126

(51) Int. Cl.
*H04W 72/12*    (2023.01)
*H04W 72/23*    (2023.01)
(Continued)

(52) U.S. Cl.
CPC ........... *H04W 72/23* (2023.01); *H04W 28/06* (2013.01); *H04W 72/0446* (2013.01); *H04W 74/0833* (2013.01)

(58) Field of Classification Search
CPC ............. H04W 72/1289; H04W 28/06; H04W 72/0446; H04W 74/0833
See application file for complete search history.

(56) References Cited

U.S. PATENT DOCUMENTS 8,270,359 B2 *   9/2012  Nangia ................. H04L 1/1896
                                                     370/329
9,130,710 B2 *   9/2015  Guo ...................... H04L 5/0037
(Continued)

FOREIGN PATENT DOCUMENTS

JP    2014531856 A   11/2014
JP    2016-506656 A   3/2016
(Continued)

OTHER PUBLICATIONS

Office Action issued in the counterpart European Patent Application No. 17770184.4, dated May 11, 2020 (8 pages).
(Continued)

*Primary Examiner* — Eunsook Choi
(74) *Attorney, Agent, or Firm* — Osha Bergman Watanabe & Burton LLP

(57) ABSTRACT

A terminal is disclosed that includes a receiver that receives higher layer signaling that indicates a periodic time period in which uplink transmission is not performed and a processor that monitors downlink control information for scheduling system information in the time period. In other aspects, a radio communication method and a base station are disclosed.

8 Claims, 17 Drawing Sheets

(51) Int. Cl.
*H04W 72/0446* (2023.01)
*H04W 28/06* (2009.01)
*H04W 74/08* (2009.01)
*H04W 72/04* (2023.01)

(56) References Cited

U.S. PATENT DOCUMENTS

| | | | | |
|---|---|---|---|---|
| 9,210,670 | B2* | 12/2015 | Papasakellariou | H04L 5/1469 |
| 9,497,749 | B2* | 11/2016 | Seo | H04W 72/042 |
| 10,355,832 | B2* | 7/2019 | Cheng | H04L 1/1854 |
| 10,356,811 | B2* | 7/2019 | Luo | H04W 72/14 |
| 10,715,373 | B2* | 7/2020 | Kim | H04L 27/2613 |
| 11,184,913 | B2* | 11/2021 | Frenne | H04L 5/0078 |
| 2014/0192730 | A1* | 7/2014 | Seo | H04L 5/0035 370/329 |
| 2015/0358133 | A1 | 12/2015 | Kusashima et al. | |
| 2017/0034785 | A1 | 2/2017 | Suzuki et al. | |
| 2017/0142738 | A1 | 5/2017 | You et al. | |
| 2021/0112557 | A1 | 4/2021 | Lee | |

FOREIGN PATENT DOCUMENTS

| | | |
|---|---|---|
| WO | 2014109302 A1 | 7/2014 |
| WO | 2015/020108 A1 | 2/2015 |
| WO | 2015/159877 A1 | 10/2015 |

OTHER PUBLICATIONS

NTT Docomo, Inc.; "Some Viewpoints about Reconfiguration Signaling Design"; 3GPP TSG RAN WG1 Meeting #75, R1-135507; San Francisco, USA; Nov. 11-15, 2013 (5 pages).
Intel Corporation; "Discussion on signaling mechanism for TDD UL-DL reconfiguration"; 3GPP TSG-RAN WG1 #74bis, R1-134123; Guangzhou, China; Oct. 7-11, 2013 (6 pages).
Qualcomm Incorporated; "TTI Shortening and Reduced Processing Time for DL Transmissions"; 3GPP TSG RAN WG1 #84, R1-160905; St. Julian's, Malta; Feb. 15-19, 2016 (4 pages).
Ericsson; "DCI bit fields for short TTI uplink transmissions"; 3GPP TSG RAN WG1 Meeting #84, R1-160941; Malta; Feb. 15-19, 2016 (5 pages).
ETRI; "Overview on frame structure and downlink design for TTI shortening"; 3GPP TSG RAN WG1 Meeting #84, R1-161011; Malta; Feb. 15-19, 2016 (8 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
International Search Report issued in PCT/JP2017/011085 dated Jun. 13, 2017 (2 pages).
Written Opinion issued in PCT/JP2017/011085 dated Jun. 13, 2017 (5 pages).
Extended European Search Report issued in counterpart European Patent Application No. 17770184.4, dated Sep. 11, 2019 (10 pages).
Nokia Siemens Networks, Nokia; "On signalling mechanisms to support dynamic TDD UL-DL reconfiguration"; 3GPP TSG-RAN WG1 Meeting #73, R1-132297; Fukuoka, Japan; May 20-24, 2013 (4 pages).
Office Action issued in European Application No. 17770184.4; dated Dec. 23, 2020 (6 pages).
Nokia Siemens Networks, Nokia; "On signalling mechanisms to support dynamic TDD UL-DL reconfiguration"; GPP TSG-RAN WG1 Meeting #73, R1-132297; Fukuoka, Japan; May 20-24, 2013 (4 pages).
Office Action issued in Japanese Application No. 2018-507317; dated Mar. 30, 2021 (6 pages).
3GPP TSG-RAN WG1 #74; R1-133583 "HARQ Design for TDD UL-DL reconfiguration" Qualcomm Incorporated; Barcelona, Spain; Aug. 19-23, 2013 (4 pages).
Office Action issued in Japanese Application No. 2018-507317, dated Nov. 16, 2021 (6 pages).
Office Action issued in Japanese Application No. 2018-507317, dated Apr. 5, 2022 (5 pages).
Office Action issued in Peruvian Application No. 001846-2018/DIN, dated Nov. 15, 2022 (12 pages).
Office Action issued in Japanese Application No. 2018-507317; dated Aug. 30, 2022 (15 pages).

* cited by examiner

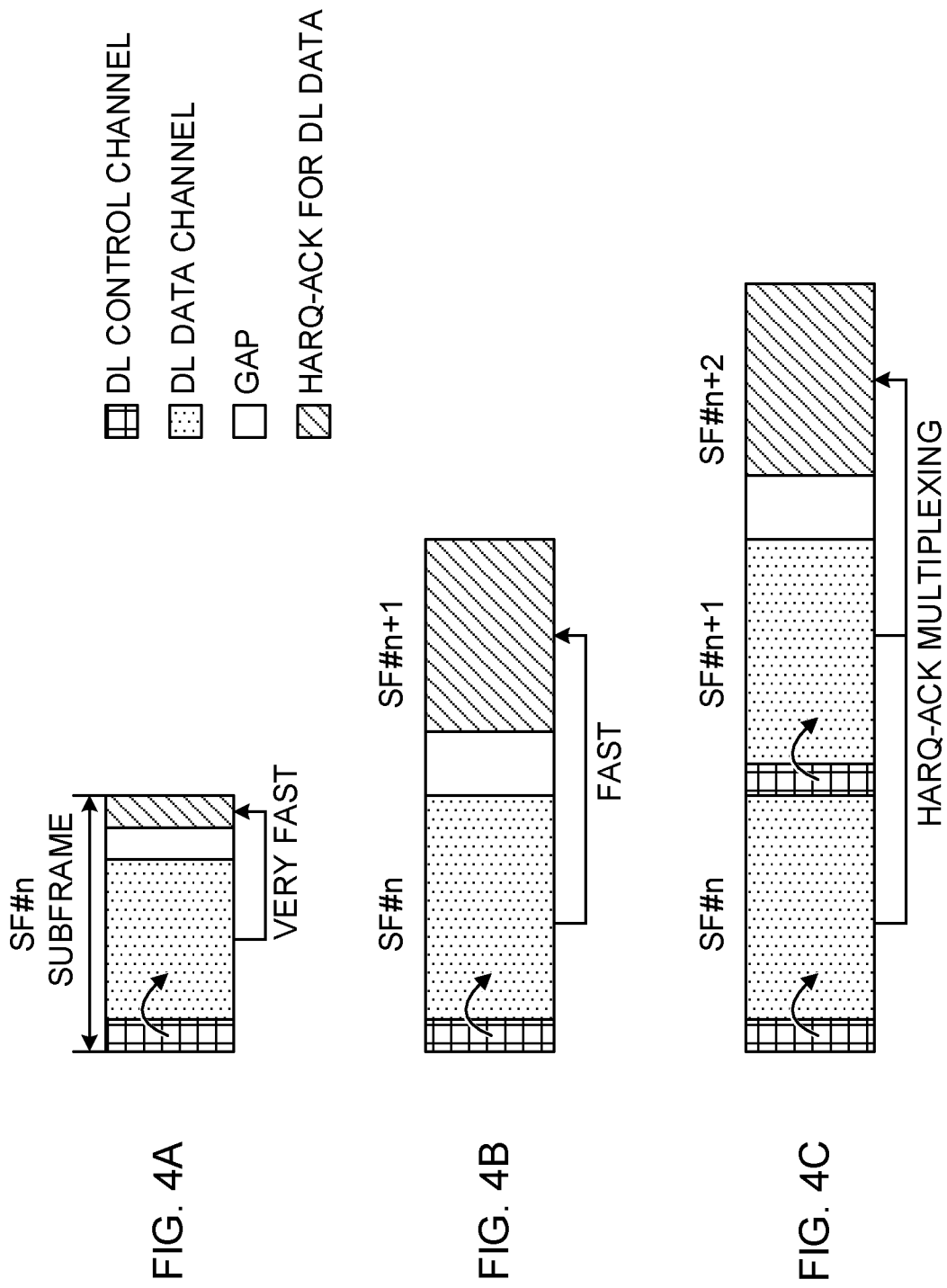

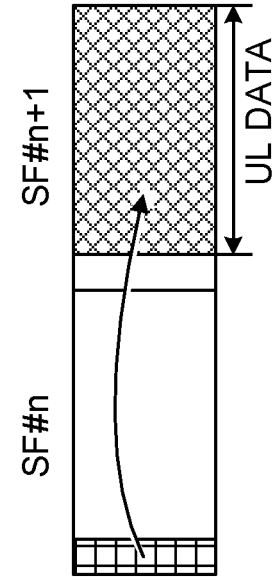
FIG. 5A
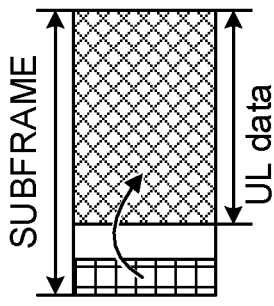
FIG. 5B
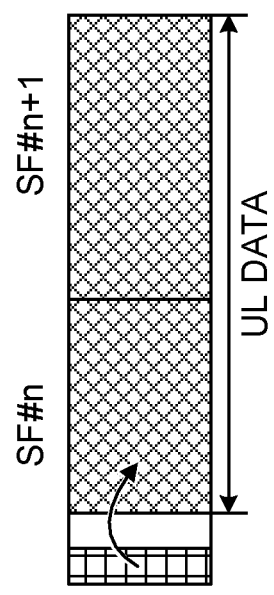
FIG. 5C
FIG. 5D
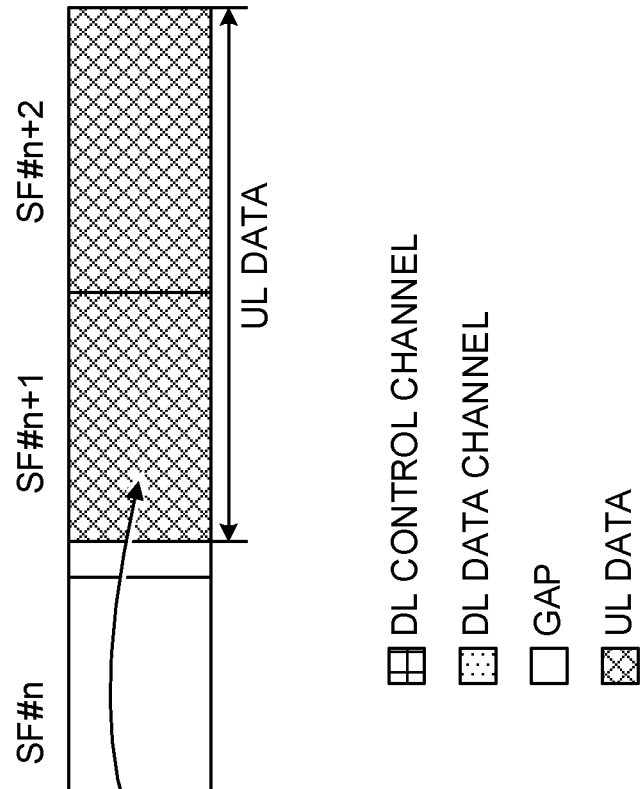

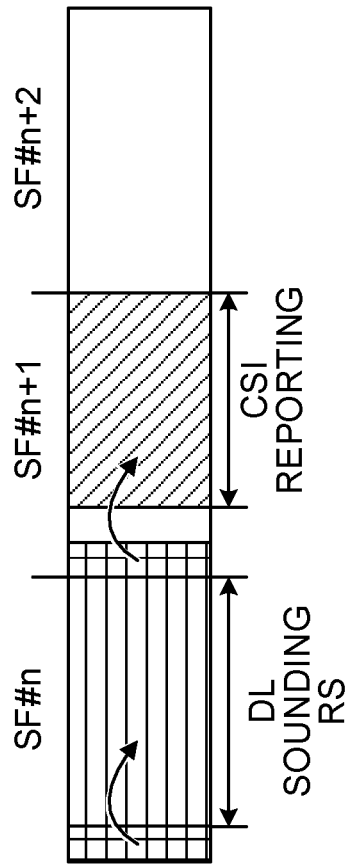
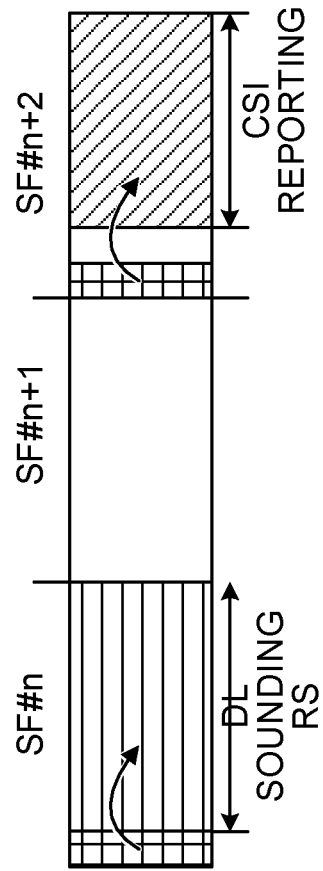
FIG. 6A
FIG. 6B

TERMINAL, RADIO COMMUNICATION METHOD FOR A TERMINAL, AND BASE STATION

CROSS-REFERENCE TO RELATED APPLICATIONS

This application is a continuation application and, thereby, claims benefit under 35 U.S.C. § 120 to U.S. patent application Ser. No. 16/086,743, filed on Sep. 20, 2018, titled "USER TERMINAL, RADIO BASE STATION AND RADIO COMMUNICATION METHOD," which is a national stage application of PCT Application No. PCT/JP2017/011085, filed on Mar. 21, 2017, which claims priority to Japanese Patent Application No. 2016-059126, filed on Mar. 23, 2016. The contents of these applications are incorporated by reference in their entirety.

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, successor systems of LTE (referred to as, for example, "LTE-A (LTE-Advanced)," "FRA (Future Radio Access)," "5G (5th generation mobile communication system)," "New-RAT (Radio Access Technology)" and so on) are also under study for the purpose of achieving further broadbandization and increased speed beyond LTE.

Existing LTE systems use control based on TDD (Time Division Duplex) and FDD (Frequency Division Duplex). For example, in TDD, whether each subframe is used in the uplink ("UL") or in the downlink ("DL") is determined strictly based on UL/DL configurations.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Now, for radio communication systems such as LTE Rel. 13 and later versions (for example, 5G), radio frames (also referred to as "lean radio frames") to provide good future scalability and excellent power saving performance are under study. Unlike existing LTE systems, in which predetermined UL/DL configurations are used, regarding these radio frames, studies are in progress to make it possible to change the direction of communication such as UL and DL, dynamically, except for certain subframes (this scheme is also referred to as "highly flexible dynamic TDD").

For example, it is possible to adopt a structure (also referred to as "frame format," "frame type," etc.), in which some subframes are used as subframes for DL communication, and in which the direction of communication is changed dynamically in the rest of the subframes. Thus, when subframes of different types are co-present, the problem is how to control the transmission/reception of signals in each subframe.

The present invention has been made in view of the above, and it is therefore an object of the present invention to provide a user terminal, a radio base station and a radio communication method, whereby the transmission/reception of signals can be controlled adequately in future radio communication systems.

Solution to Problem

A user terminal, according to one aspect of the present invention, communicates by using first subframe for DL communication and second subframe for UL transmission and/or DL transmission that are configured between the first subframe configured in a given periodicity, and the user terminal has a receiving section that receives a first downlink control channel transmitted in the first subframe and a second downlink control channel transmitted in the second subframe, and a control section that controls transmission and reception of signals based on the first downlink control channel and/or the second downlink control channel, and the first downlink control channel and the second downlink control channel schedule at least different signals.

Advantageous Effects of Invention

According to the present invention, it is possible to control the transmission and reception of signals adequately in future radio communication systems.

BRIEF DESCRIPTION OF DRAWINGS

FIGS. 4A to 4C are diagrams to show other examples of the role of a DL control channel in dynamic subframes;

FIGS. 5A to 5D are diagrams to show other examples of the role of a DL control channel in dynamic subframes;

FIGS. 6A and 6B are diagrams to show other examples of the role of a DL control channel in dynamic subframes;

DESCRIPTION OF EMBODIMENTS

Figure 1:
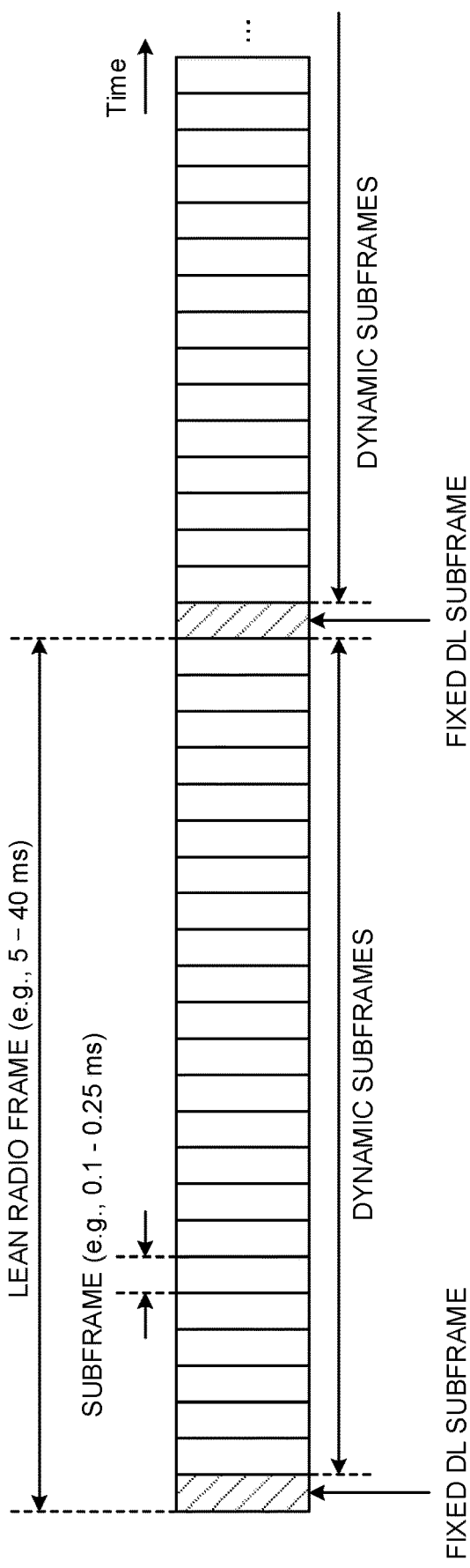
FIG. 1 is a diagram to show an example of the structure of lean radio frames.

Now, referring to FIG. 1, an example of a communication method using a radio frame format (for example, lean radio frames) for future radio communication systems of LTE Rel. 13 and later versions (for example, 5G) will be described. FIG. 1 is a diagram to show an example of the structure of lean radio frames. As shown in FIG. 1, lean radio frames have a predetermined time duration (for example, five to forty ms). A lean radio frame is comprised of a plurality of subframes, where each subframe has a predetermined time duration (for example, 0.125 ms, 0.25 ms, 1 ms, etc.).

Subframes in lean radio frames can be configured to have a shorter time duration than the subframes of existing LTE systems (LTE Rel. 8 to 12). As a result of this, subframes in lean radio frames can be transmitted and received in a short time compared to existing LTE systems. Furthermore, a subframe may be referred to as a "transmission time interval (TTI)." Subframes in lean radio frames can be made shorter than the subframes of existing LTE systems (LTE Rel. 8 to 12) (one ms). In this case, subframes in lean radio frames may be referred to as "short TTIs," "short subframes," and so on. Meanwhile, subframes in lean radio frames can be the same length (one ms) as the subframes of existing LTE systems (LTE Rel. 8 to 12). In this case, subframes in lean radio frames may be referred to as "LTE subframes," "normal TTIs," "long TTIs," and so on.

As shown in FIG. 1, lean radio frames can be configured in a format in which some of the subframes are determined, in advance, as being subframes for DL communication (DL subframes). These DL subframes are subframes in which the direction of communication is determined in advance, and therefore referred to as "fixed subframes," "fixed DL subframes" and so on. These fixed DL subframes can be configured in a given periodicity (for example, in a cycle of five ms or more).

FIG. 1 shows a case where a fixed DL subframe is provided at the head of a lean radio frame. Note that the format of the lean radio frame and the number and positions of fixed DL subframes in the lean radio frame are not limited to those shown in FIG. 1. Multiple fixed DL subframes may be configured in a lean radio frame. When multiple DL subframes are configured, fixed DL subframes may be mapped so as to concentrate at a specific time within a lean radio frame (for example, in a specific period of two ms within a cycle of ten ms), so that it is possible to make the cycle of fixed DL subframes longer, and reduce energy consumption in, for example, radio base stations and user terminals that perform transmission/reception using fixed DL subframes. Meanwhile, by mapping fixed DL subframes so as to be distributed within a lean radio frame, it is possible to make the cycle of fixed DL subframes shorter, which can, for example, make it easier to build quality connections with user terminals that move at high speeds. The locations and the cycle of time resources for fixed DL subframes may be selected by a radio base station from a plurality of combinations that are prepared in advance, and a possible combination may be detected by a user terminal on a blind basis, or the locations and the cycle of time resources for fixed DL subframes may be reported from the radio base station to the user terminal via broadcast signals, RRC signaling and so on.

Meanwhile, lean radio frames can be configured so that the direction of communication in subframes other than fixed DL subframe can be changed dynamically. Since the direction of communication is changed dynamically in these subframes, these subframes are also referred to as "flexible subframes," "dynamically-utilized subframes," "dynamic subframes," and so on.

The direction of communication (or the UL/DL configuration) in dynamic subframes may be specified by the fixed DL subframe (semi-dynamic assignment), or may be specified by a DL control signal (also referred to as a "DL control channel," an "L1/L2 control signal," an "L1/L2 control channel," etc.) provided in each dynamic subframe (dynamic assignment). That is, the direction of communication in dynamic subframes may be changed per radio frame, which is comprised of a plurality of subframes, or may be changed per subframe. Thus, to change the direction of communication in subframes dynamically within a lean radio frame, dynamic changes in subframe units are by no means limiting, and semi-dynamic changes in units of radio frames, which are comprised of multiple subframes, may be included as well.

Figure 2:
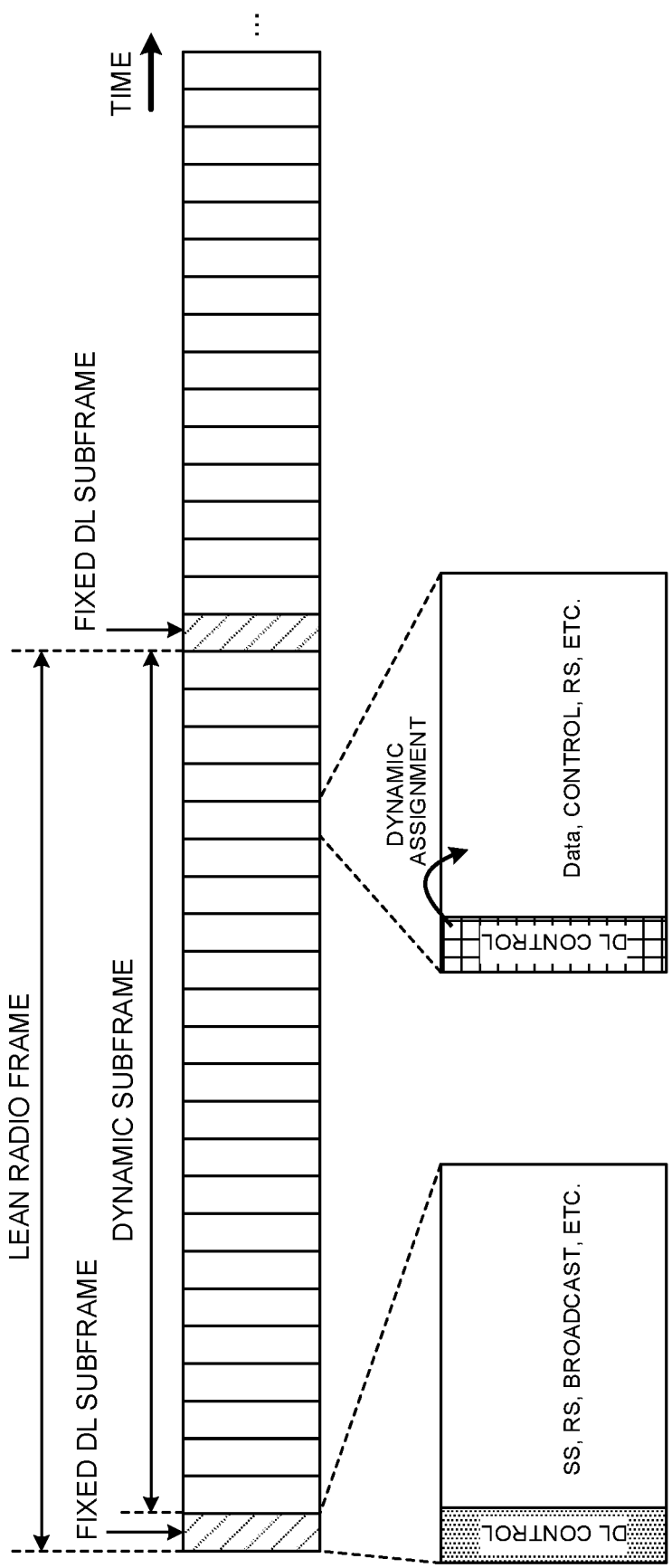
FIG. 2 is a diagram to explain the roles of a downlink control channel in different types of subframes.

FIG. 2 is a diagram to show examples of the structures of fixed DL subframes and dynamic subframes. Here, a case is shown in which fixed DL subframes are configured in a given cycle, and multiple dynamic subframes are configured between fixed DL subframes. Note that the structures of fixed DL subframes and dynamic subframes shown in FIG. 2 are simply examples, and those shown in FIG. 2 are by no means limiting.

In a dynamic subframe, for example, at least one of DL data, UL data, the DL sounding reference signal (also referred to as the "CSI measurement reference signal," the "CSI-RS," etc.), the UL sounding reference signal (also referred to as the "SRS"), uplink control information (UCI) and a random access preamble is transmitted and/or received. Meanwhile, fixed DL subframes are configured so that at least one of cell discovery (detection), synchronization, measurements (for example, RRM (Radio Resource Management) measurements including RSRP (Reference Signal Received Power) measurements), mobility control and initial access control takes place.

In this case, it is possible that the signal transmission and/or receiving processes (scheduling) in dynamic subframes and fixed DL subframes are performed using downlink control channels provided in each subframe. However, dynamic subframes and fixed DL subframes transmit different signals (at least one different signal).

Controlling different types of subframes by applying the same downlink control channel (for example, a downlink control channel that is used in existing systems) in this way might make it difficult to transmit and receive signals adequately. Also, when a downlink control channel is designed so as to be compatible with both of these different types of subframes, the overhead of the downlink control channel might increase.

So the present inventors have focused on the fact that dynamic subframes and fixed subframes have different roles, and come up with the idea of controlling the transmission and/or reception of signals and/or channels by changing the role of a downlink control channel when transmitted in different types of subframes.

For example, in a dynamic subframe, a DL control channel (or a DL control signal) may specify how this dynamic subframe or the next or a later predetermined dynamic subframe should be used. In this case, a radio base station can command (schedule) a user terminal to receive DL data, transmit UL data, receive the DL sounding RS, transmit the UL sounding RS, send feedback in response to uplink control information, transmit a random access preamble and so on, by using a DL control signal.

As shown in FIG. 2, the DL control signal may be time-division-multiplexed (TDM: Time Division Multiplexing) and/or frequency-division-multiplexed (FDM: Frequency Division Multiplexing) with other signals transmitted in the dynamic subframe (for example, a data signal, a control signal, a reference signal, etc.), or may be embedded in a data signal (or may be arranged in resource elements (REs) in part of the symbols assigned to the data signal).

In dynamic subframes, the user terminal tries to receive the DL control signal in each dynamic subframe, and, upon successful decoding, the user terminal transmits and/or receives signals in the same dynamic subframe and/or in the next and subsequent subframes, based on this DL control signal.

Furthermore, assignment may be performed so that transmission/reception control (scheduling) is completed within dynamic subframes, in order to enable short-time communication. This type of assignment is also referred to as "self-contained assignment." Subframes, in which self-contained assignment is performed, may be referred to as "self-containment subframes." Self-contained subframes may be referred to as "self-contained TTIs" or "self-contained symbol sets," or other names may be applied as well.

In a self-contained subframe, the user terminal may receive a DL signal based on a DL control signal, and also transmit a feedback signal (for example, an HARQ-ACK and/or the like) in response to the DL signal. Furthermore, the user terminal may transmit a UL signal based on the DL control signal, and also receive a feedback signal in response to the UL signal. By using self-contained subframes, it is possible to realize feedback with ultra-low delay of one ms or less, for example, so that the latency can be reduced.

Meanwhile, in a fixed DL subframe, too, a DL control signal that has a different role than the DL control signals transmitted in dynamic subframes may specify how this fixed DL subframe (or the next or a later predetermined dynamic subframe) should be used. For example, by using the DL control signal, the radio base station can schedule information (for example, a broadcast signal or a broadcast-based signal) to be reported in common to a plurality of user terminals, report information about the subframe format of the dynamic subframe (for example, information about the direction of communication in the data channel), and report information about the position of the fixed UL subframe, and so on.

A DL control signal in a fixed DL subframe may be able to specify how this fixed DL subframe or the next or a later predetermined dynamic subframe should be used, like a DL control signal in a dynamic subframe can. In this case, in addition to the above-noted uses of a fixed DL subframe, the radio base station can, using a DL control signal transmitted and received in a fixed DL subframe, command (schedule) the user terminal to receive DL data, receive the DL sounding RS and so on. When DL control signals of different roles are multiplexed over the same DL control channel, for example, different IDs (RNTIs and/or the like) can be applied to the DL control signals of respective roles to mask the CRC (Cyclic Redundancy Check). In this case, in fixed DL subframes, the information to be reported in common to a plurality of user terminals (for example, a broadcast signal or a broadcast-based signal) can be scheduled, information about the subframe format of dynamic subframes (for example, information about the direction of communication in the data channel) can be reported, and DL data and the DL sounding RS can be transmitted and scheduled using resources that are left after reporting information about the position of the fixed UL subframe, and so on.

Also, a DL control signal to be transmitted in a fixed DL subframes can be made control information that is effective for a predetermined period that is longer than a subframe (TTI). For example, a DL control signal to be transmitted in a fixed DL subframe can be made control information that is effective at least for a longer period than a DL control signal transmitted in dynamic subframes. Here, to say that control information is effective for a predetermined period, this means that control such as transmission and/or reception (for example, scheduling) works for the user terminal for a predetermined period.

Now, embodiments of the present invention will be described below in detail with reference to the accompanying drawings. Note that the radio communication methods according to the embodiments may be applied individually or may be applied in combination.

That is, in the following embodiments, a subframe (TTI) may be a subframe (one ms) in existing LTE, may be a shorter period than one ms (for example, one to thirteen symbols), or may be a longer period than one ms.

(First Aspect)

Based on a first aspect of the present invention, an example of the role of a downlink control channel (downlink control information, a downlink control signal, etc.) transmitted in dynamic subframes will be described.

In a dynamic subframe, using downlink control information (DCI), a radio base station commands a user terminal to do at least one of the following:

(1-1) Receive the DL data scheduled in the subframe containing DCI;

(1-2) Transmit the UL data scheduled in the subframe containing DCI or the next or a later predetermined subframe;

(1-3) Receive the DL reference signal (for example, the DL sounding RS) scheduled in the subframe containing DCI;

(1-4) Transmit the uplink reference signal (for example, the UL sounding RS) scheduled in the subframe containing DCI or the next or a later predetermined subframe; and (1-5) Transmit the random access preamble (PRACH) scheduled in the subframe containing DCI or the next or a later predetermined subframe.

When the radio base station commands reception of a DL reference signal, the radio base station may also report the scheduling information of UL data and/or the UL control channel for reporting the measurement result of the DL reference signal, to the user terminal.

The user terminal performs the receiving process (for example, blind-decoding) of DCI, which is user-specific (UE-specific). For example, the radio base station transmits DCIs that are generated from CRCs that have been scrambled using user-specific indicators (for example, RNTIs). The user terminal identifies the DCI that has passed the CRC as a result of decoding, as the DCI addressed to the subject user terminal.

<DL Data>

Figure 3A:
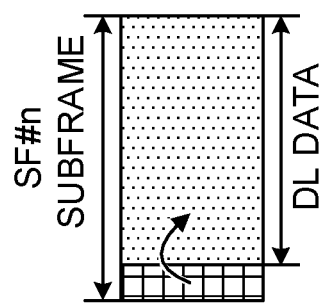
FIGS. 3A to 3C are diagrams to show examples of the role of a DL control channel in dynamic subframes.
Figure 3B:
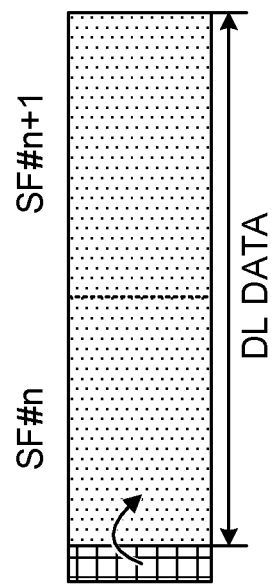
Figure 3C:
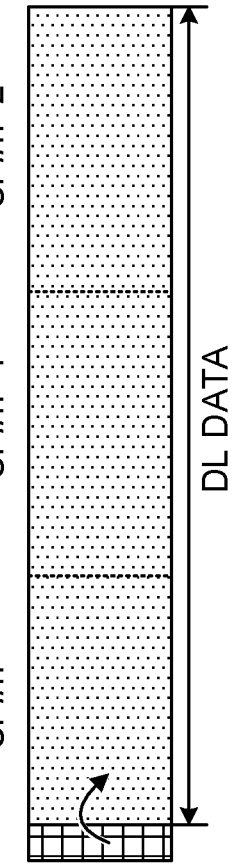

DCI that schedules DL data may be configured to schedule a DL data channel that is transmitted in a single subframe, or configured to schedule a DL data channel that spans multiple subframes. FIGS. 3A, 3B, and 3C show examples of the method of assigning a DL data channel in dynamic subframes.

FIG. 3A shows a case where the DCI transmitted in SF #n controls the scheduling of the DL data channel transmitted in SF #n. FIG. 3B shows a case where the DCI transmitted in subframe #n controls the scheduling of the DL data channel transmitted in SF #n and SF #n+1. FIG. 3C shows a case where the DCI transmitted in SF #n controls the scheduling of the DL data channel transmitted in SF #n, SF #n+1 and SF #n+2. As shown in FIGS. 3B and 3C, the assignment of data in a plurality of subframes (by expanding the TTI) is controlled by one DCI, so that the overhead of DCI can be reduced.

Although FIGS. 3B and 3C show cases where DCI is not assigned to SF #n+1 and SF #n+2, it is also possible to adopt a structure in which DCI (for example, DCI to schedule other user terminals) is assigned to these SFs. In addition, the TTI duration (the number of subframes) of the DL data scheduled by DCI can be explicitly specified to the user terminal by using a predetermined bit field included in the DCI. For example, referring to FIG. 3C, information to indicate that data is assigned over three subframes (SF #n to #n+2) can be included in the DCI of SF #n.

Alternatively, the user terminal may implicitly determine the TTI duration of DL data where DCI is scheduled, based on the transport block size (TB size), the PRBs and so on.

Furthermore, the DCI to schedule DL data may be configured to include the scheduling information of the UL control channel for transmitting an HARQ-ACK (delivery acknowledgment signal, ACK/NACK, A/N, etc.). FIGS. 4A, 4B, and 4C show examples of the method of transmitting an A/N in response to DL data transmitted in dynamic subframes.

FIG. 4A shows a case (self-contained subframe) where the DCI transmitted in SF #n controls the scheduling of the DL data channel transmitted in this SF #n, and where an A/N in response to this DL data is fed back in SF #n. In this case, it is possible to complete the reception of DL data and A/N feedback in response to this DL data within subframe #n, so that the throughput and the latency of data communication can be improved significantly.

FIG. 4B shows a case where the DCI transmitted in SF #n controls the scheduling of the DL data channel transmitted in this SF #n, and where an A/N in response to this DL data is fed back in SF #n+1. In this case, as compared with FIG. 4A, the period from the time the DL data is received in the user terminal to the time the A/N is fed back becomes long, so that the processing load of the user terminal can be reduced. Also, assuming that the A/N is transmitted with the same transmission power, the received-signal-to-interference-plus-noise ratio (SINR) increases when the A/N transmission period becomes longer, so that the received quality of the A/N can be improved.

FIG. 4C shows a case where the scheduling of the DL data channel transmitted in SF #n is controlled by the DCI transmitted in SF #n, the scheduling of the DL data channel transmitted in SF #n+1 is controlled by the DCI transmitted in SF #n+1, and A/Ns in response to the DL data of SF #n and SF #n+1 are fed back in next SF #n+2 or a later SF.

In this case, the period from the time the user terminal receives the DL data to the time the A/Ns are fed back becomes long, compared to FIG. 4A, so that the processing load of the user terminal can be reduced. Also, assuming that the A/Ns are transmitted with the same transmission power, the received-signal-to-interference-plus-noise ratio (SINR) increases when the A/N transmission period becomes longer, so that the received quality of the A/Ns can be improved. Also, since A/Ns in response to data in a plurality of subframes (here, SF #n and SF #n+1) can be fed back together, it is possible to reduce the increase in the number of times A/Ns are fed back, and improve the efficiency of the use of resources.

Note that, although FIGS. 3A, 3B, 3C, 4A, 4B, and 4C show cases where a downlink control channel, a downlink data channel and an uplink control channel are time-multiplexed (TDM), the present embodiment is by no means limited to this. For example, a structure may be adopted here, in which at least a downlink control channel and a downlink data channel are frequency-multiplexed (FDM) in each subframe.

<UL Data>

DCI that schedules UL data may be configured to schedule a UL data channel that is transmitted in a single subframe, or may be configured to schedule a UL data channel that spans multiple subframes. FIGS. 5A, 5B, 5C, and 5D show examples of the method of assigning a UL data channel in dynamic subframes.

FIG. 5A shows a case where the DCI transmitted in SF #n controls the scheduling of the UL data channel transmitted in SF #n. FIG. 5B shows a case where the DCI transmitted in subframe #n controls the scheduling of the UL data channel transmitted in SF #n and SF #n+1.

Note that FIGS. 5A and 5B show cases where UL data is transmitted at least in the same SF as the SF in which DCI is transmitted (here, SF #n), but this is by no means limiting. A structure may be adopted here, in which UL data is transmitted in the next or a later predetermined SF after the SF in which DCI is transmitted.

For example, FIG. 5C shows a case where the DCI transmitted in SF #n controls the scheduling of the UL data channel to be transmitted in or after the next SF (here, SF #n+1). In this case, processing time is reserved in the user terminal, so that it is possible to reduce the increase of processing load in the user terminal. Note that the interval between the subframe in which DCI is received and the subframe in which the UL data channel is transmitted does not have to be one subframe. The interval may change depending the processing capability of the user terminal, the amount of UL data that is assigned, whether or not MIMO is employed, and so on.

FIG. 5D shows a case where the DCI transmitted in subframe #n controls the scheduling of the UL data channel transmitted in SF #n+1 and SF #n+2. In this case, it is possible to reserve processing time in the user terminal, and, furthermore, reduce the number of times to transmit DCI that schedules UL data transmission. By this means, it is possible to suppress the increase of processing load in the user terminal, and, furthermore, and reduce the overhead of DCI.

Although FIGS. 5B and 5C show cases where DCI is not assigned to SF #n+1 and SF #n+2, a structure may be adopted here in which DCI (for example, DCI to schedule other user terminals) is assigned to these SFs. In this case, the user that transmits the UL data channel over SF #n and SF #n+1 does not transmit the UL data channel (does not map resources) in the time period in which the DL control channel of SF #n+1 is mapped. Furthermore, the TTI duration (the number of subframes) in the UL data scheduled by DCI can be explicitly indicated to the user terminal using a predetermined bit field in the DCI. Alternatively, the user terminal may implicitly determine the TTI duration in the UL data where DCI is scheduled, based on the transport block size (TB size), the PRBs and so on.

<DL Reference Signal>

The user terminal performs a measurement (such as an RRM measurement and/or a CSI measurement) based on a DL reference signal (for example, a DL sounding RS), and feeds back the measurement result. In this case, the radio base station reports the scheduling of the DL reference signal to the user terminal using DCI. Also, the scheduling information of the UL control/data channel for feeding back the measurement result (for example, CSI information) may be included in the DCI for scheduling the DL reference signal, and reported to the user terminal, or the scheduling information of the UL control/data channel for feeding back the measurement result (for example, CSI information) may be reported to the user terminal in different DCI.

FIGS. 6A and 6B show examples of the method of assigning DL reference signals in dynamic subframes. FIG. 6A shows a case where the DCI transmitted in SF #n controls the scheduling of the DL reference signal transmitted in SF #n, and where the DCI to schedule the UL control channel for transmitting the measurement result is transmitted in the next SF (here, SF #n+1). That is, FIG. 6A shows a case where the scheduling of the DL reference signal and the scheduling of the measurement result (for example, CSI report) are commanded using different DCIs.

In addition, the feedback of the measurement result does not have to be commanded in the next subframe of the SF in which the DL reference signal is transmitted, and may be commanded in a predetermined subframe after the next subframe. FIG. 6B shows a case where the DCI transmitted in SF #n controls the scheduling of the DL reference signal transmitted in SF #n, and where the DCI to schedule the UL control channel for transmitting the measurement result is transmitted in the next or a later predetermined SF (here, SF #n+2). In this case, processing time is reserved in the user terminal, so that it is possible to reduce the increase of processing load in the user terminal.

<UL Reference Signal>

Figure 7A:
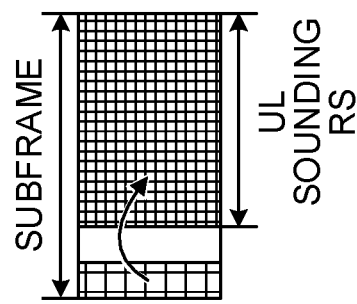
FIGS. 7A and 7B are diagrams to show other examples of the role of a DL control channel in dynamic subframes.

The radio base station determines channel states and so on based on a UL reference signal (for example, a UL sounding RS) transmitted from the user terminal. In this case, the radio base station reports the schedule of the UL reference signal to the user terminal using DCI. The user terminal transmits the UL reference signal in the same subframe and/or the next or a later predetermined subframe based on the DCI (see FIG. 7A). FIG. 7A shows a case where the user terminal controls the transmission of the UL reference signal within the same subframe based on DCI.

<PRACH>

The user terminal sends a random access preamble (PRACH) in random access procedures. In this case, the radio base station can report the schedule of the PRACH to the user terminal using DCI. Based on the DCI, the user terminal transmits the PRACH in the same subframe and/or the next or a later predetermined subframe (see FIG. 7B).

Figure 7B:
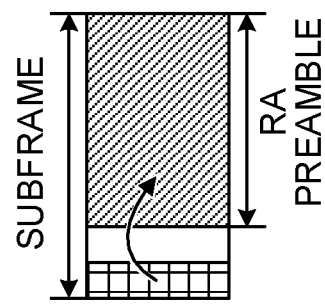

FIG. 7B shows a case where the user terminal controls the transmission of the PRACH within the same subframe based on DCI. Furthermore, using the DCI of a predetermined subframe, the radio base station may schedule PRACH transmission over a plurality of subframes after the predetermined subframe.

(Second Aspect)

Based on a second aspect of the present invention, an example of the role of a downlink control channel (downlink control information, a downlink control signal, etc.) transmitted in fixed DL subframes will be described.

Using downlink control information (DCI) in a fixed DL subframe, the radio base station indicates at least one of the following to the user terminal:

(2-1) The schedule of broadcast and/or system information in a predetermined period;

(2-2) Information about the UL/DL subframe format (for example, TDD UL/DL configuration) in a predetermined period;

(2-3) Information about the frequency resources available in a predetermined period;

(2-4) Information about the contention-based random access (contention-based RA) and/or the UL data resources in a predetermined period; and (2-5) Information about the fixed UL subframes within a predetermined period.

The predetermined period is the period in which DCI is effective, and, for example, the next fixed DL subframe period (during a given cycle) can be the predetermined period.

The user terminal performs the receiving process (for example, blind-decoding) of DCI, which is common between users (UE-common). For example, the radio base station transmits DCIs that are generated from CRCs that have been masked using a user-common indicator (for example, an RNTI). The user terminal identifies the DCI that has passed the CRC as a result of decoding, as the DCI addressed to the subject user terminal.

Also, the DL control signal in fixed DL subframes is not limited to UE-common DCI, and may be configured to transmit UE-specific DCI as well. In this case, at least one of DL data, UL data, a DL reference signal, a UL reference signal, uplink control information and a random access preamble may be scheduled using DCI, in fixed DL subframes. In that case, the user terminal blind-decodes at least two DCIs—namely, the UE-common DCI and the UE-specific DCI—in fixed DL subframes.

(Broadcast and/or System Information)

Figure 8:
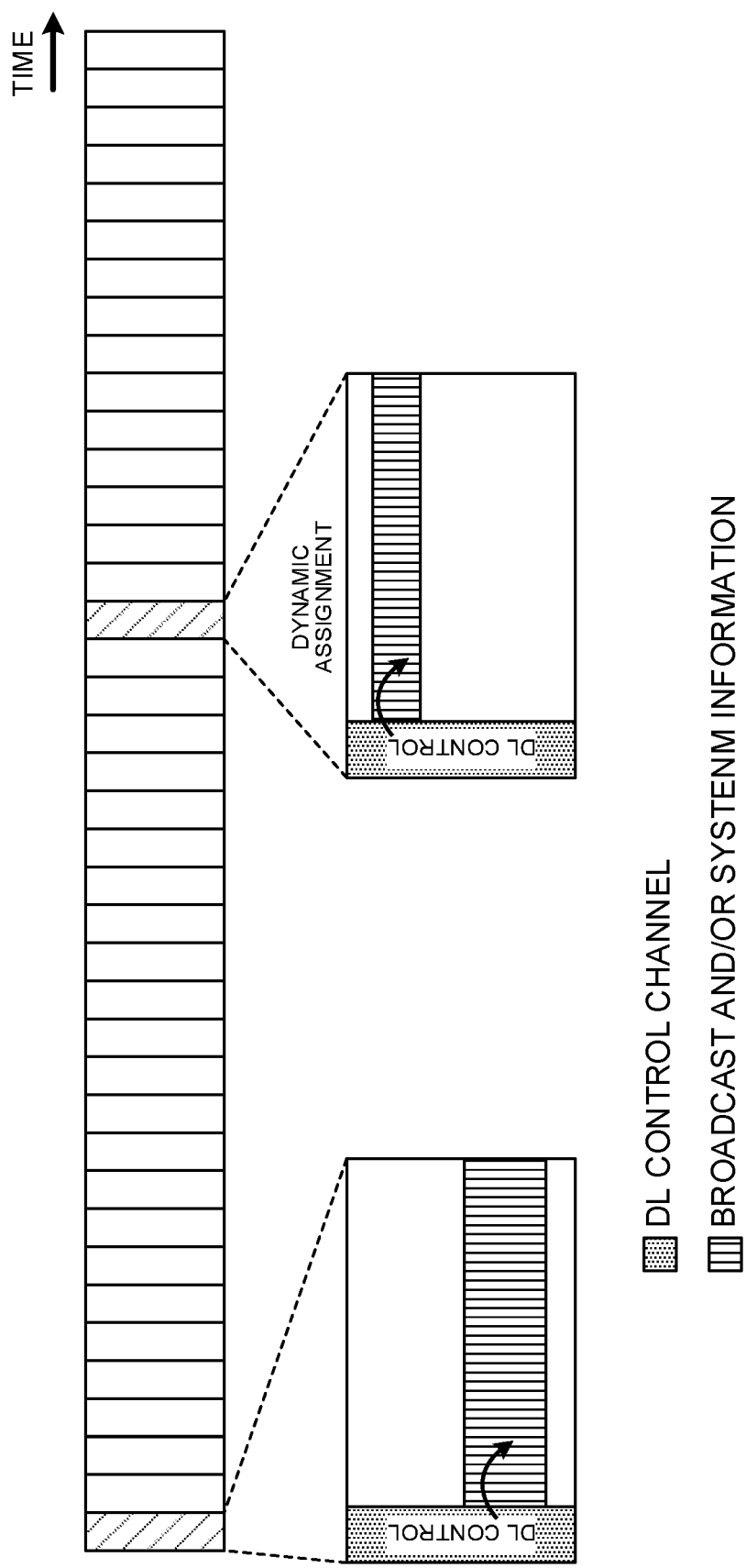
FIG. 8 is a diagram to show an example of the role of a DL control channel in fixed DL subframes.

The radio base station can report the schedule information of broadcast and/or system information to the user terminal via the DL control channel in fixed DL subframes (see FIG. 8). For example, the user terminal can perform the receiving operation assuming that the broadcast and/or system information is scheduled in fixed DL subframes.

Given that broadcast and system information is information that is common among a plurality of user terminals, the CRC of the DL control signal in fixed DL subframes scheduling these pieces of information may be masked using a user-common RNTI, which is different from user-specific RNTIs. The user-common RNTI may be a fixed value (for example, 0 or 1), or the radio base station may configure an arbitrary value from a plurality of values (for example, 1 to 3), and the user terminal may detect the value by way of blind detection. If the user-common RNTI can be configured out of multiple RNTIs, for example, multiple pieces of different broadcast and/or system information, with CRCs masked with different RNTIs, can be transmitted and received using the same carrier. This makes it possible to report different pieces of broadcasts and/or system information depending on use such as for mobile broadband services, MTC services, high-reliability communication, and so on.

Also, different signals may be transmitted among multiple fixed DL subframes. For example, the radio base station can transmit a given DL signal in all fixed DL subframes and transmit another DL signal in some fixed DL subframes. For example, this may be equivalent to the case where the cycle of transmission varies between one DL signal and another DL signal.

It is possible to configure broadcast information (for example, system information) flexibly by adopting a structure, in which, using DCI, the radio base station can schedule the UE-common information to transmit in fixed DL subframes.

In addition, the radio base station may control the scheduling of broadcast and/or system information in dynamic subframes using the DCI of fixed DL subframes.

(UL/DL Subframe Format)

Figure 9:
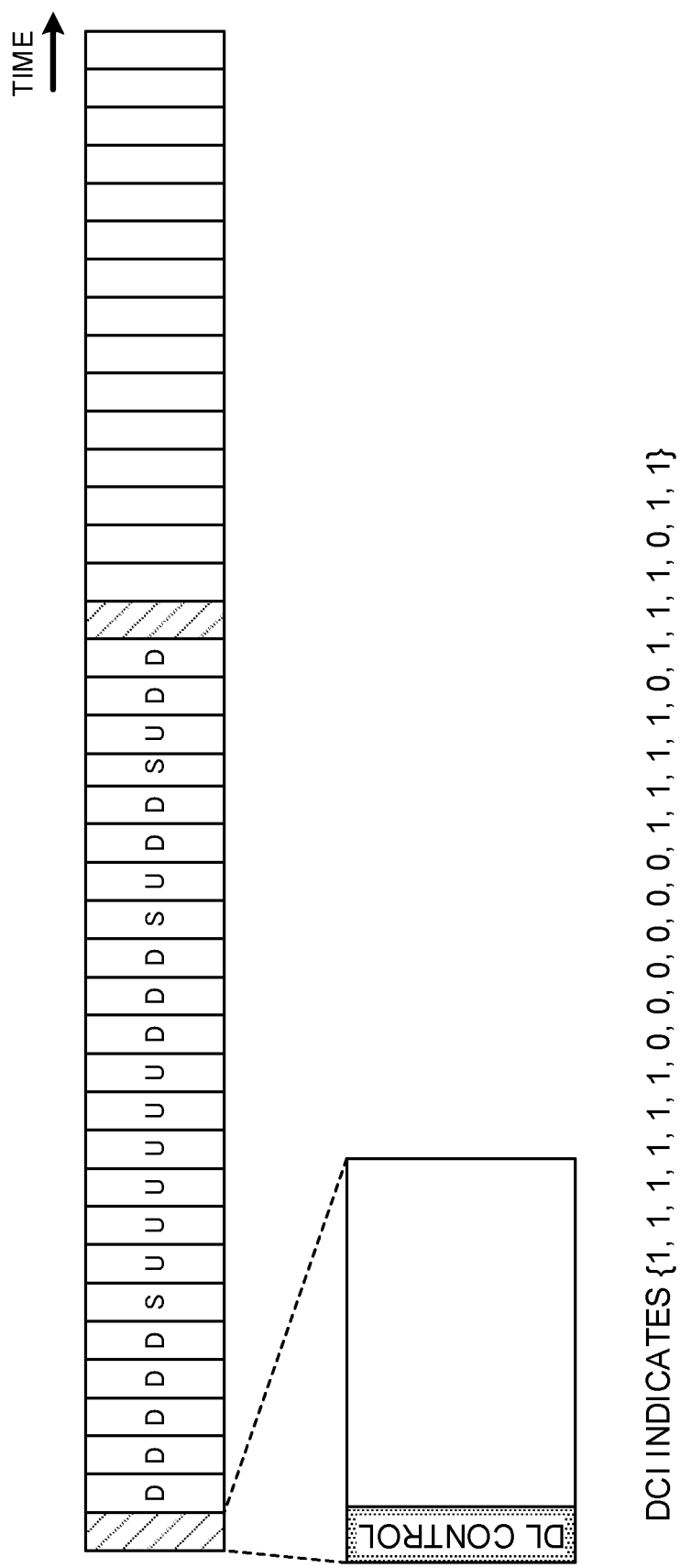
FIG. 9 is a diagram to show another example of the role of a DL control channel in fixed DL subframes.

The radio base station may report the format of each subframe in a predetermined period using a DL control channel in fixed DL subframes (see FIG. 9). For example, the radio base station can report to the user terminal whether every subframe (for example, every dynamic subframe) that is configured between fixed DL subframes is a UL subframe, a DL subframe or a special subframe. The predetermined period can be, for example, the period up to the next fixed DL subframe.

For example, the radio base station can report UL/DL in a predetermined period (for example, twenty subframes) to the user terminal by using a bitmap, which is formed with twenty bits. When three states—namely, the DL subframe (D), the special subframe (S) and the UL subframe (U)—are configured, a bitmap that applies two bits to each subframe can be included in DCI and reported to the user terminal.

Alternatively, given that the special subframe (S) is inserted while the DL subframe (D) switches to the UL subframe (U), it may be possible to configure a bitmap that applies one bit to each subframe, and see the subframe where "D" switches to "U" as being "S." By this means, the overhead of DCI (bitmap) can be reduced.

FIG. 9 shows a case where the DL subframe (D) is recognized as "1," the UL subframe (U) is recognized as "0," and the subframe of "1" when "1" switches to "0" is recognized as the "special subframe" (S). In this way, the subframe format of dynamic subframes is reported to the user terminal using downlink control information in fixed DL subframes, so that the user terminal can perform transmission/reception appropriately by identifying the direction of communication in dynamic subframes.

(Frequency Resource Information)

Figure 10:
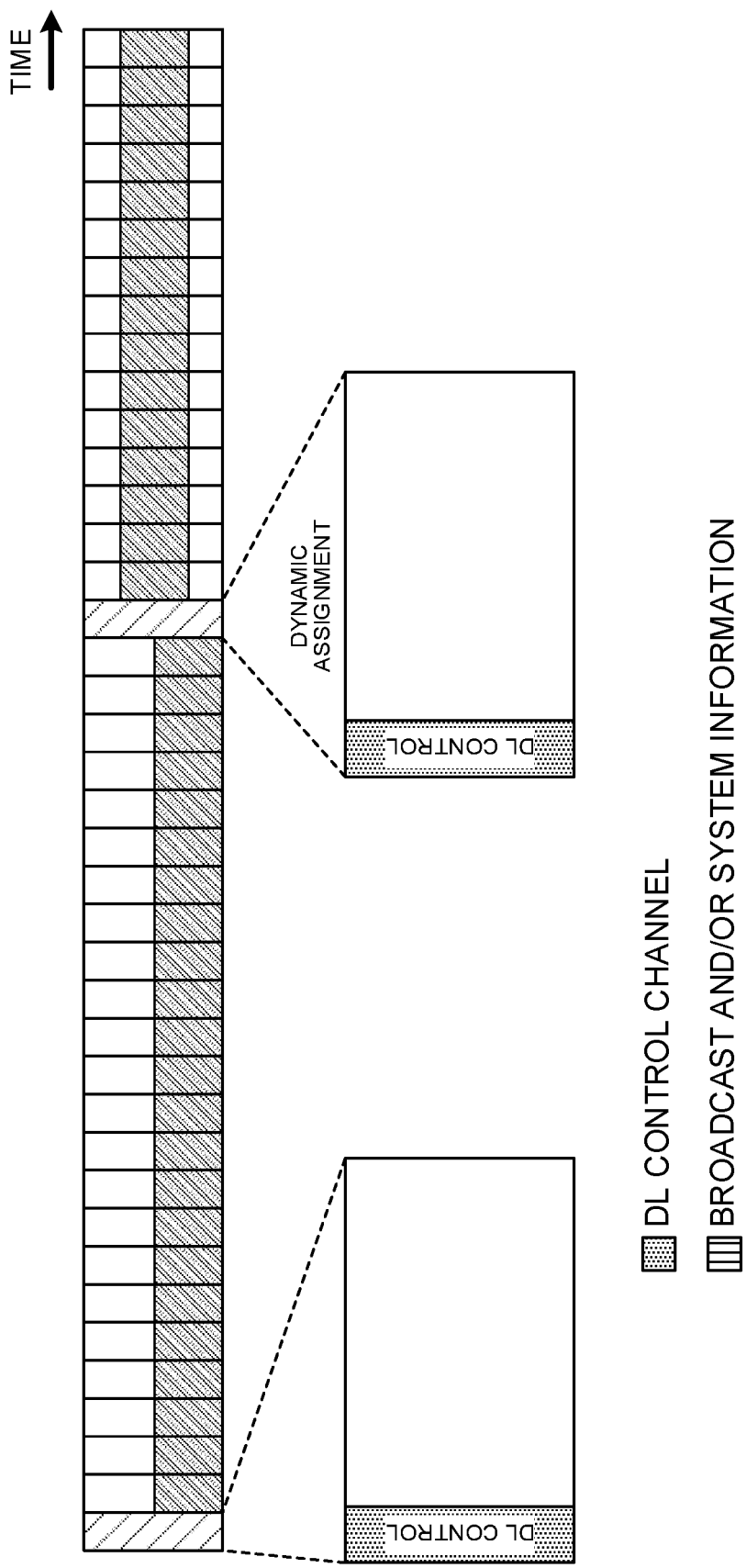
FIG. 10 is a diagram to show another example of the role of a DL control channel in fixed DL subframes.

The radio base station may report information about the frequency resources that are available in a predetermined period using a DL control channel in fixed DL subframes (see FIG. 10). FIG. 10 shows a case where, by using the DCI of fixed DL subframe #1, frequency resources that are available in dynamic subframes that are configured in a predetermined period (in this case, the period up to next fixed DL subframe #2) are reported to the user terminal. Also, in the case illustrated here, by using the DCI of fixed DL subframe #2, frequency resources that are available in dynamic subframes configured in a predetermined period are reported to the user terminal.

When the user terminal receives DCI containing information about available frequency resources, in a fixed DL subframe, the user terminal performs transmission and/or reception, during the predetermined period, on the assumption that signals are scheduled only in the frequency resources (for example, PRBs) indicated by the DCI. Also, during the predetermined period, frequency resources that are not available to the user terminal can be assigned to other user terminals, other systems, other RATs, etc.

In this way, information about frequency resources that are available in dynamic subframes is reported to the user terminal using downlink control information in fixed DL subframes, so that the user terminal can learn which resources are available in dynamic subframes, and perform transmission and reception appropriately.

(Fixed UL Subframe Information)

Figure 11:
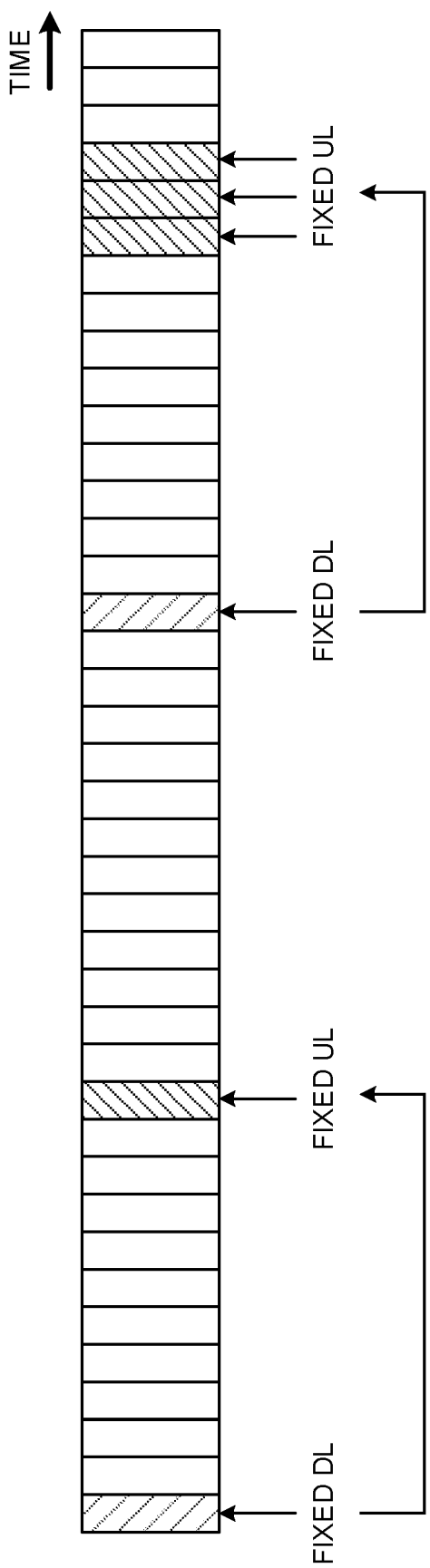
FIG. 11 is a diagram to show another example of the role of a DL control channel in fixed DL subframes.

The radio base station may report fixed UL subframes included in a predetermined period, by using a DL control channel in a fixed DL subframe (see FIG. 11). The fixed UL subframes may be subframes for use for UL communication. The user terminal may assume that the user terminal does not have to receive DL signals in the fixed UL subframes reported using the DCI of the fixed DL subframe. In this case, the user terminal does not have to control reception in the fixed UL subframes, so that the battery consumption can be saved.

Random access preambles and/or UL data resources can be configured in fixed UL subframes.

By configuring contention-based random access preamble (contention-based RA preamble) resources in fixed UL subframes, the user terminal can make initial access, handover and so on, using these fixed UL subframes. In this case, the user terminal can transmit random access preambles, which are required in initial access and/or handover control, in resources specified by the DCI included in a fixed DL subframe. Also, by employing a structure in which fixed UL subframes are not specified in cells that do not support initial access and/or the like (for example, cells used only as secondary cells), resources can be saved.

By configuring contention-based UL data resources in fixed UL subframes, it is possible to reduce the overhead of DL control channels, reduce the delay of UL data assignment and so on. The user terminal, when contention-based UL data transmission is configured (or allowed), can identify the resources for UL data transmission by receiving the DCI contained in a fixed DL subframe.

The user terminal, to which UL data resources are indicated, transmits UL data using these UL data resources. In this case, the user terminal can transmit UL data by including the user terminal's identification information (for example, the user terminal ID) in the UL data. By this means, the radio base station, upon receiving the UL data, can properly identify from which user terminal the UL data has been transmitted.

As described above, according to the present embodiment, downlink control channels in fixed DL subframes are configured to have functions that are at least different from those of downlink control information in dynamic subframes. By this means, it is possible to adequately control the transmission and reception of signals in subframes having varying roles, by using downlink control information in each subframe.

(Radio Communication System)

Now, the structure of a radio communication system according to an embodiment of the present invention will be described below. In this radio communication system, communication is performed using one or a combination of the radio communication methods according to the above aspects of the present invention.

Figure 12:
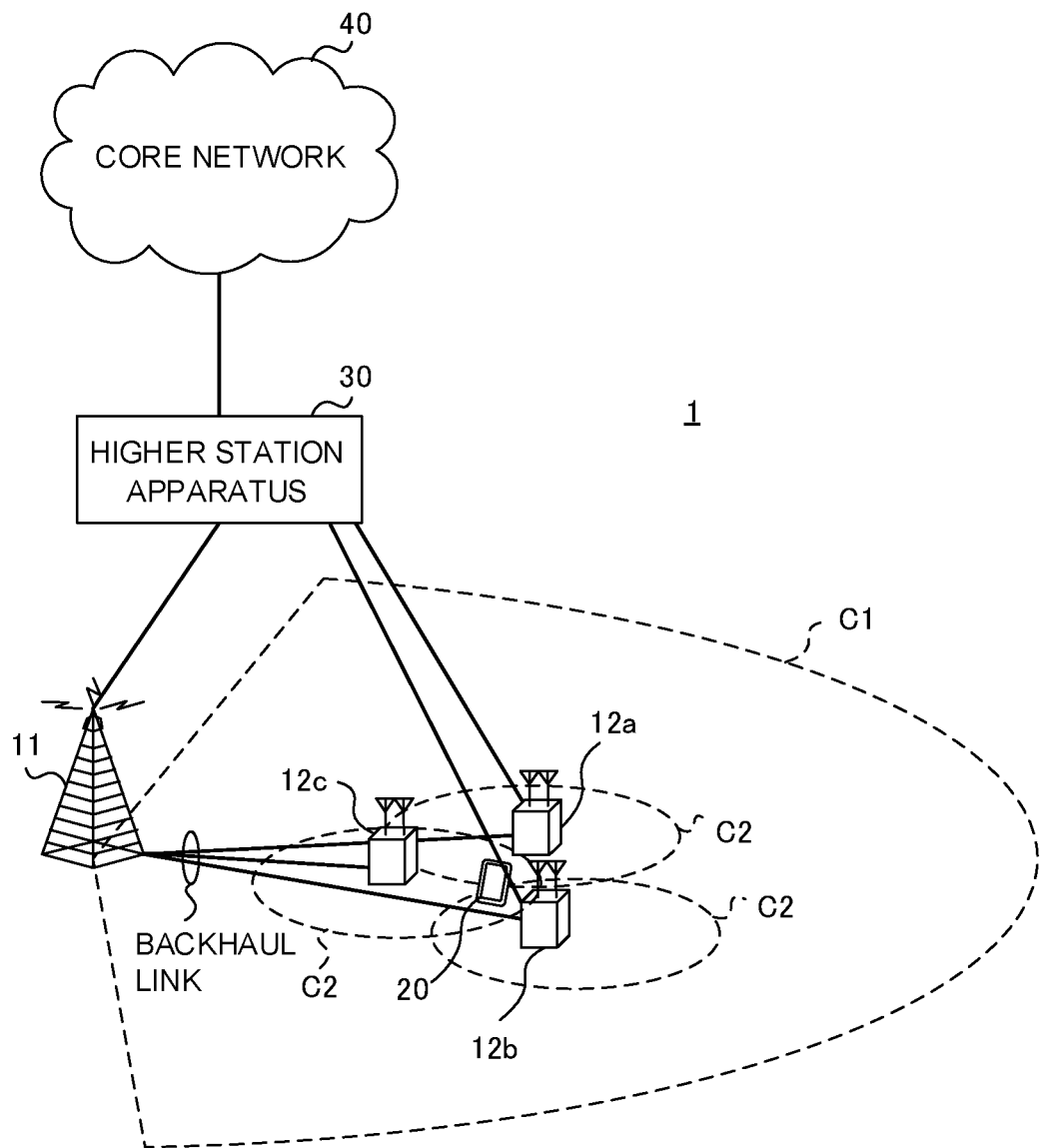
FIG. 12 is a diagram to show an example of a schematic structure of a radio communication system according to one embodiment of the present invention.

FIG. 12 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 shown in FIG. 12 includes a radio base station 11 that forms a macro cell C1, and radio base stations 12 (12*a* to 12*c*) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

<Radio Base Station>

Figure 13:
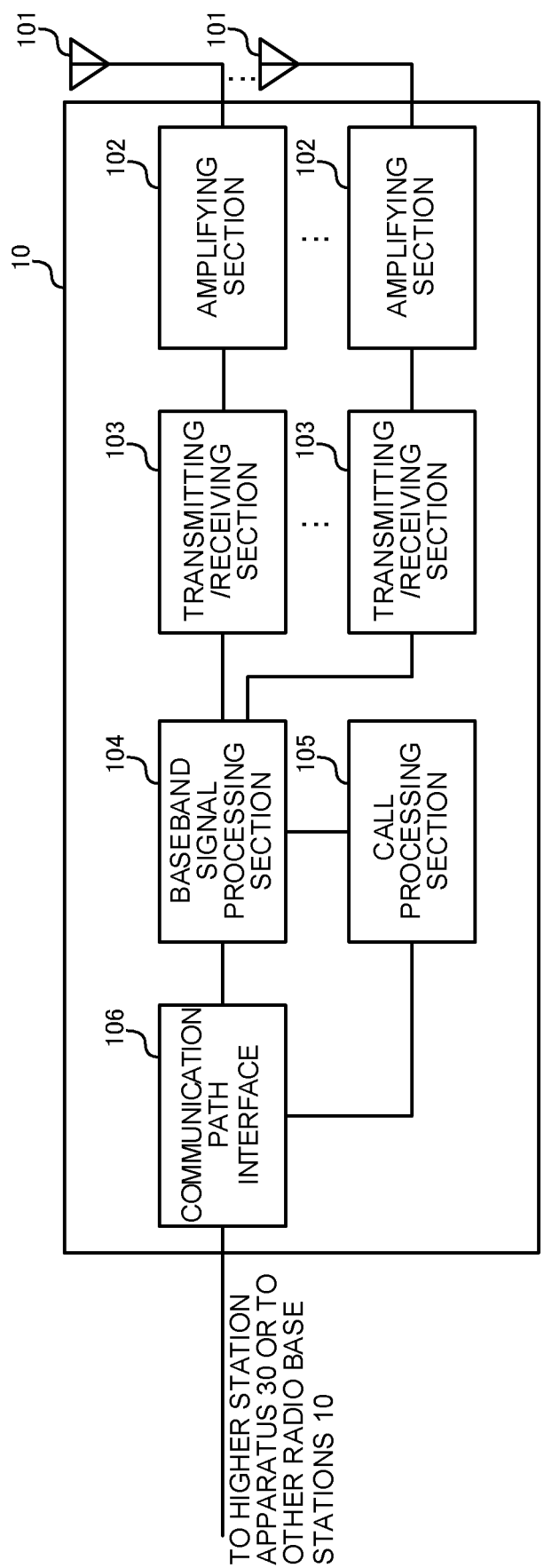
FIG. 13 is a diagram to show an example of an overall structure of a radio base station according to one embodiment of the present invention.

FIG. 13 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 through downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit a first downlink control channel in first subframes (for example, fixed DL subframes) for DL communication. In addition, the transmitting/receiving sections 103 transmit a second downlink control channel in second subframes (dynamic subframes) that are configured between the first subframes, which are configured in a given cycle, and that are used for UL communication and/or DL communication. The first downlink control channel and the second downlink control channel at least schedule different signals (or channels).

Figure 14:
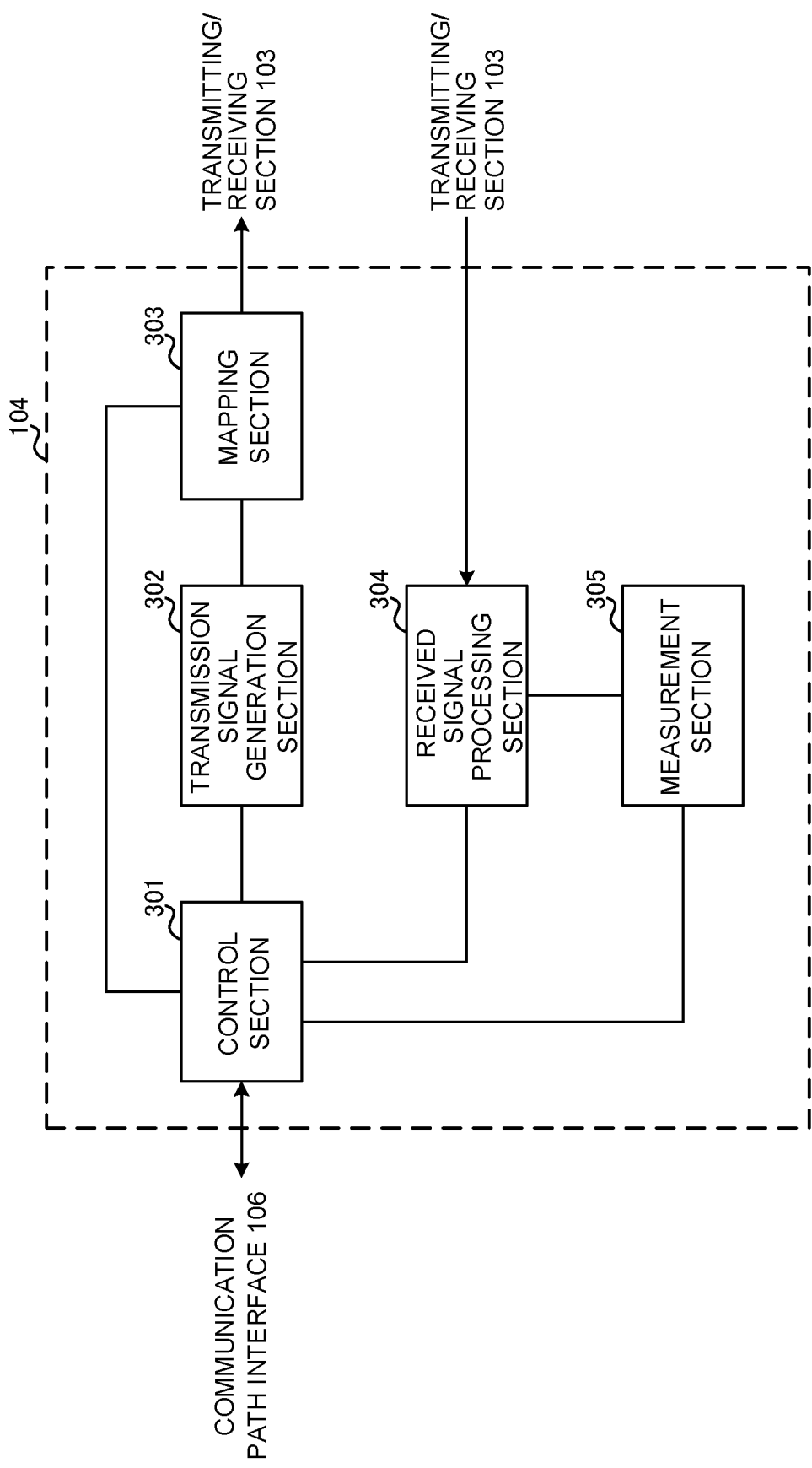
FIG. 14 is a diagram to show an example of a functional structure of a radio base station according to one embodiment of the present invention.

FIG. 14 is a diagram to show an example of a functional structure of a radio base station according to one embodiment of the present invention. Note that, although FIG. 14 primarily shows functional blocks that pertain to characteristic parts of the present embodiment, the radio base station 10 has other functional blocks that are necessary for radio communication as well. As shown in FIG. 14, the baseband signal processing section 104 has a control section (scheduler) 301, a transmission signal generation section 302, a mapping section 303, a received signal processing section 304 and a measurement section 305.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals that are transmitted in the PDSCH and downlink control signals that are communicated in the PDCCH and/or the EPDCCH. The control section 301 controls the generation of downlink control signals (for example, delivery acknowledgement information and so on), downlink data signals and so on, based on whether or not retransmission control is necessary, decided in response uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DMRS and so on.

In addition, the control section 301 controls the scheduling of uplink data signals that are transmitted in the PUSCH, uplink control signals (for example, delivery acknowledgment information) that are transmitted in the PUCCH and/or the PUSCH, random access preambles that are transmitted in the PRACH, uplink reference signals, and so on.

The control section 301 controls the downlink control channels in fixed DL subframes and the downlink control information in dynamic subframes to schedule at least different signals (or channels).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 15:
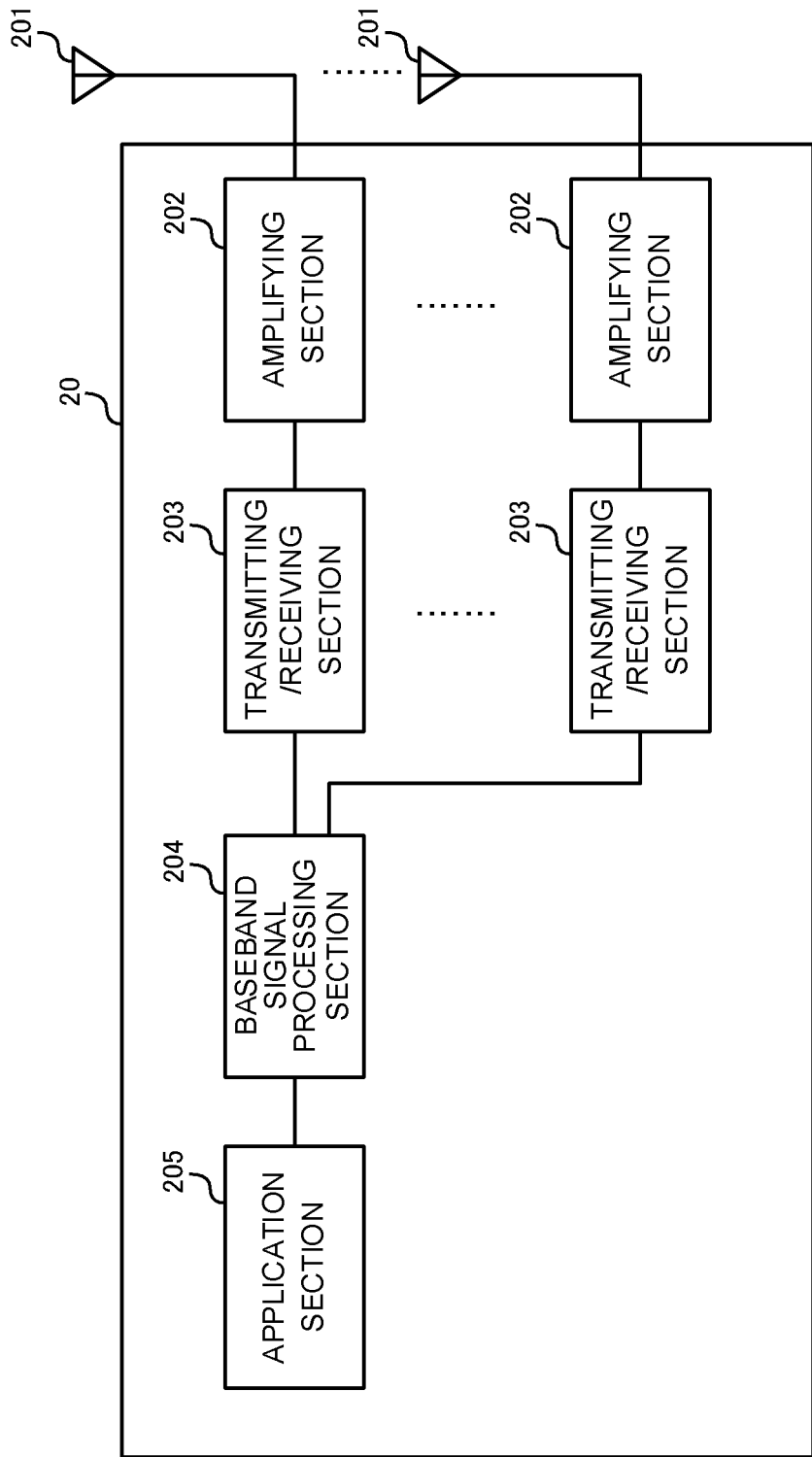
FIG. 15 is a diagram to show an example of an overall structure of a user terminal according to one embodiment of the present invention.

FIG. 15 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals and transmit UL signals. For example, the transmitting/receiving sections 203 receive a first downlink control channel, transmitted in first subframes (for example, fixed DL subframes) for DL communication. In addition, the transmitting/receiving sections 203 receive a second downlink control channel, transmitted in second subframes (dynamic subframes) that are configured between the first subframes, which are configured in a given cycle, and that are used for UL communication and/or DL communication. The first downlink control channel and the second downlink control channel at least schedule different signals (or channels).

In addition, the transmitting/receiving sections 203 can receive the first downlink control channel in the first subframes based at least on user-common information, and receive the second downlink control channel in the second subframes based on user-specific information.

Figure 16:
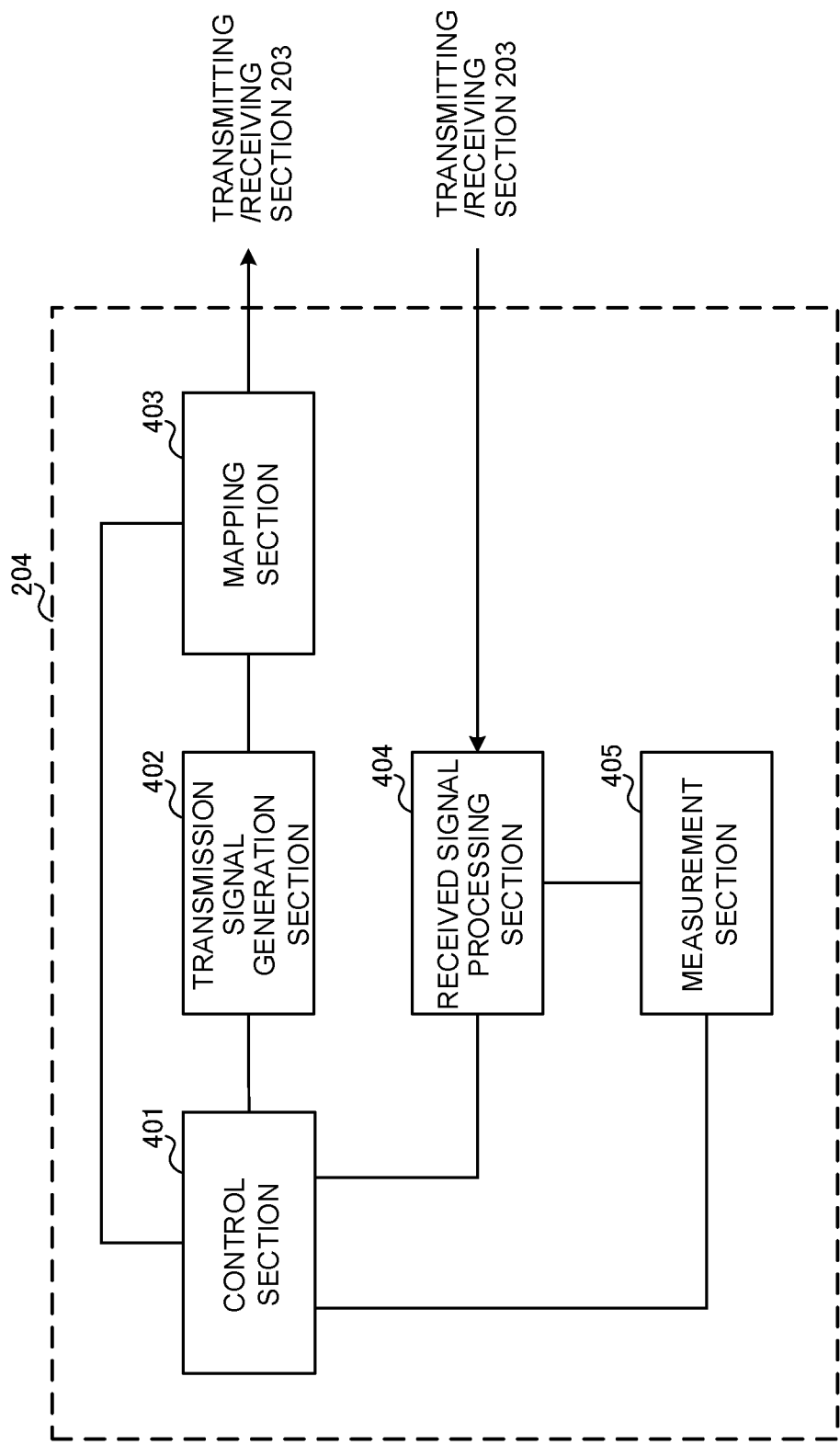
FIG. 16 is a diagram to show an example of a functional structure of a user terminal according to one embodiment of the present invention.

FIG. 16 is a diagram to show an example of a functional structure of a user terminal according to one embodiment of the present invention. Note that, although FIG. 16 primarily shows functional blocks that pertain to characteristic parts of the present embodiment, the user terminal 20 has other functional blocks that are necessary for radio communication as well. As shown in FIG. 16, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and the downlink data signals (signals transmitted in the PDSCH) transmitted from the radio base station 10, via the received signal processing section 404. The control section 401 controls the generation of uplink control signals (for example, delivery acknowledgement information), uplink data signals and so on, based whether or not retransmission control is necessary, decided in response to the downlink control signals and/or downlink data signals, and so on.

The control section 401 controls the transmission and reception of signals based on the first downlink control channel transmitted in fixed DL subframes and/or the second downlink control channel transmitted in dynamic subframes. For example, based on the second downlink control channel, the control section 401 controls at least one of reception of DL data and reception of DL reference signals scheduled in the same subframe, and transmission of UL data, transmission of UL reference signals and transmission of random access preambles scheduled in the same subframe or the next or a later predetermined subframe.

In addition, the control section 401 controls reception of DL data and/or transmission of UL data scheduled over multiple subframes, based on the second downlink control channel (see FIGS. 3A, 3B, 3C, 4A, 4B, and 4C).

Furthermore, in a predetermined period, the downlink control information that is transmitted in the first downlink control channel can be configured to include at least one of the schedule of signals, information about the subframe format, information about the frequency resources, information about the resources for use in random access procedures, and information about the subframes for use for UL communication.

The control section 401 controls the reception of broadcast information scheduled in the first subframes or the second subframes based on the first downlink control channel. Also, when the downlink control information transmitted in the first downlink control channel includes information about subframes for UL communication, the control section 401 controls the transmission of random access preambles and/or UL data in subframes for UL communication.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is contained in a downlink control signal that is reported from the radio base station 10, the control section 401 commands the transmission signal generation section 402 to generate uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 blind-decodes DCI (DCI format) that schedules transmission and/or reception of data (TBs: Transport Blocks), based on commands from the control section 401.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ), the channel states and so on of the received signals. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 17:
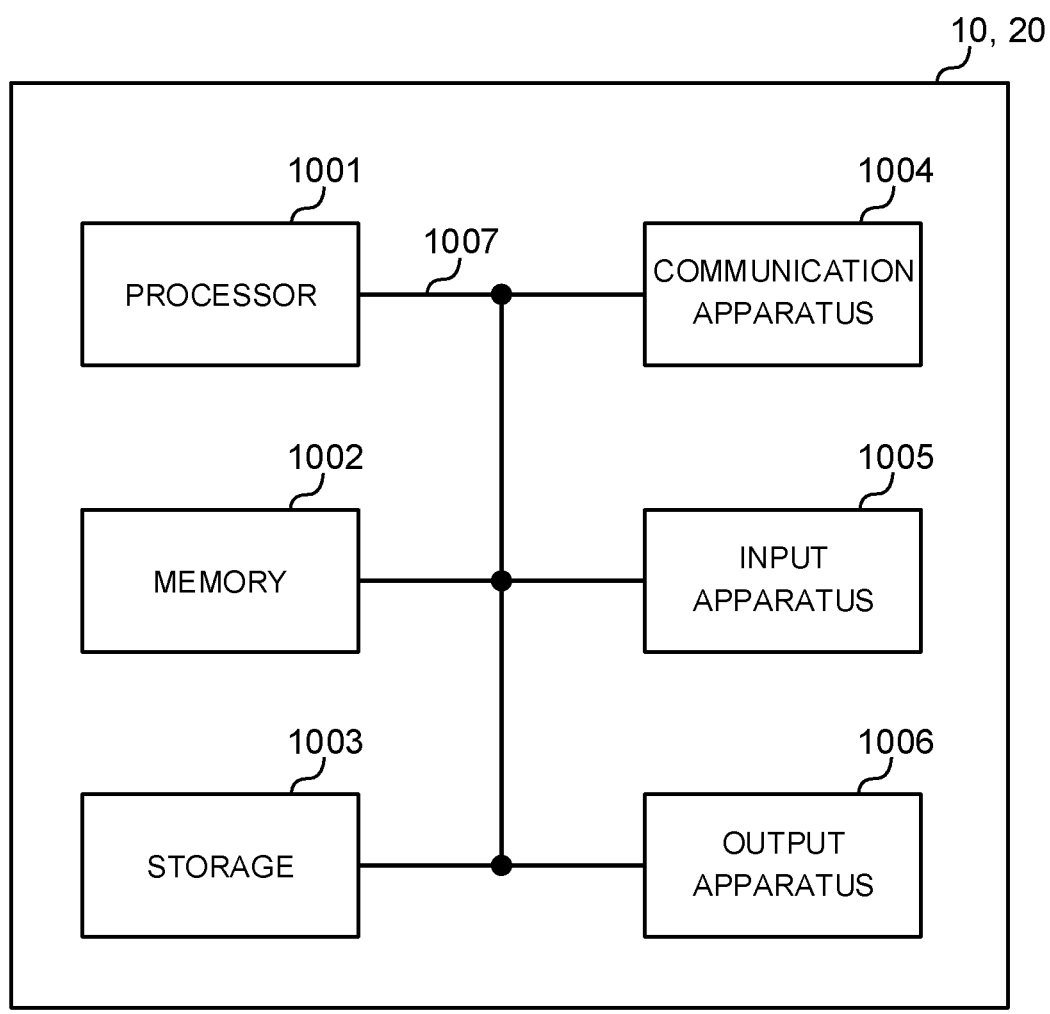
FIG. 17 is a diagram to show an example of a hardware structure of a radio base station and a user terminal according to one embodiment of the present invention.

That is, a radio base station, a user terminal and so on according to an embodiment of the present invention may function as a computer that executes the processes of the radio communication method of the present invention. FIG. 17 is a diagram to show an example of a hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory (primary storage apparatus)" and so on. The memory 1002 can store executable programs (program codes), software modules and the like for implementing the radio communication method according to one embodiment of the present invention.

The storage 1003 is a computer-readable recording medium, and is configured with at least one of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this.

A TTI having a time duration of one ms may be referred to as a "normal TTI (TTI in LTE Rel. 8 to 12)," a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

The aspects/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the aspects/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives higher layer signaling that indicates a periodic time period in which uplink transmission is not performed,
      wherein not performing the uplink transmission occurs periodically in the periodic time period; and
   a processor that:
      monitors, downlink control information for scheduling system information, in the periodic time period, and
      determines a resource block that is available in a period up to the next periodic time period based on the downlink control information for scheduling the system information in the periodic time period.

2. The terminal according to claim 1, wherein the periodic time period comprises a plurality of consecutive symbols.

3. The terminal according to claim 1, wherein the periodic time period is not configured for uplink transmission in accordance with downlink control information indicating a UL/DL configuration.

4. A radio communication method for a terminal, comprising:
receiving higher layer signaling that indicates a periodic time period in which uplink transmission is not performed,
wherein not performing the uplink transmission occurs periodically in the periodic time period;
monitoring, downlink control information for scheduling system information, in the periodic time period; and
determining a resource block that is available in a period up to the next periodic time period based on the downlink control information for scheduling the system information in the periodic time period.

5. The terminal according to claim 2, wherein the periodic time period is not configured for uplink transmission in accordance with downlink control information indicating a UL/DL configuration.

6. A base station comprising:
a transmitter that transmits higher layer signaling that indicates a periodic time period in which uplink transmission is not performed,
wherein not performing the uplink transmission occurs periodically in the periodic time period; and
a processor that:
controls, transmission of downlink control information for scheduling system information, in the periodic time period, and
controls transmission of the downlink control information for scheduling the system information in the periodic time period to determine, in a terminal, a resource block that is available in a period up to the next periodic time period.

7. A system comprising a terminal and a base station, wherein:
the terminal comprises:
a receiver that receives higher layer signaling that indicates a periodic time period in which uplink transmission is not performed,
wherein not performing the uplink transmission occurs periodically in the periodic time period; and
a processor of the terminal that:
monitors, downlink control information for scheduling system information, in the periodic time period, and
determines a resource block that is available in a period up to the next periodic time period based on the downlink control information for scheduling the system information in the periodic time period, and
the base station comprises:
a transmitter that transmits the higher layer signaling; and
a processor of the base station that:
controls, transmission of the downlink control information, in the periodic time period, and
controls transmission of the downlink control information for scheduling the system information in the periodic time period to determine, in the terminal, the resource block.

8. The terminal according to claim 1, wherein the downlink control information for scheduling the system information has a CRC scrambled by a specific RNTI.

* * * * *